No. 692,626. Patented Feb. 4, 1902.
G. P. CLARK.
FOOT PROPELLING DEVICE.
(Application filed Mar. 3, 1900.)
(No Model.)
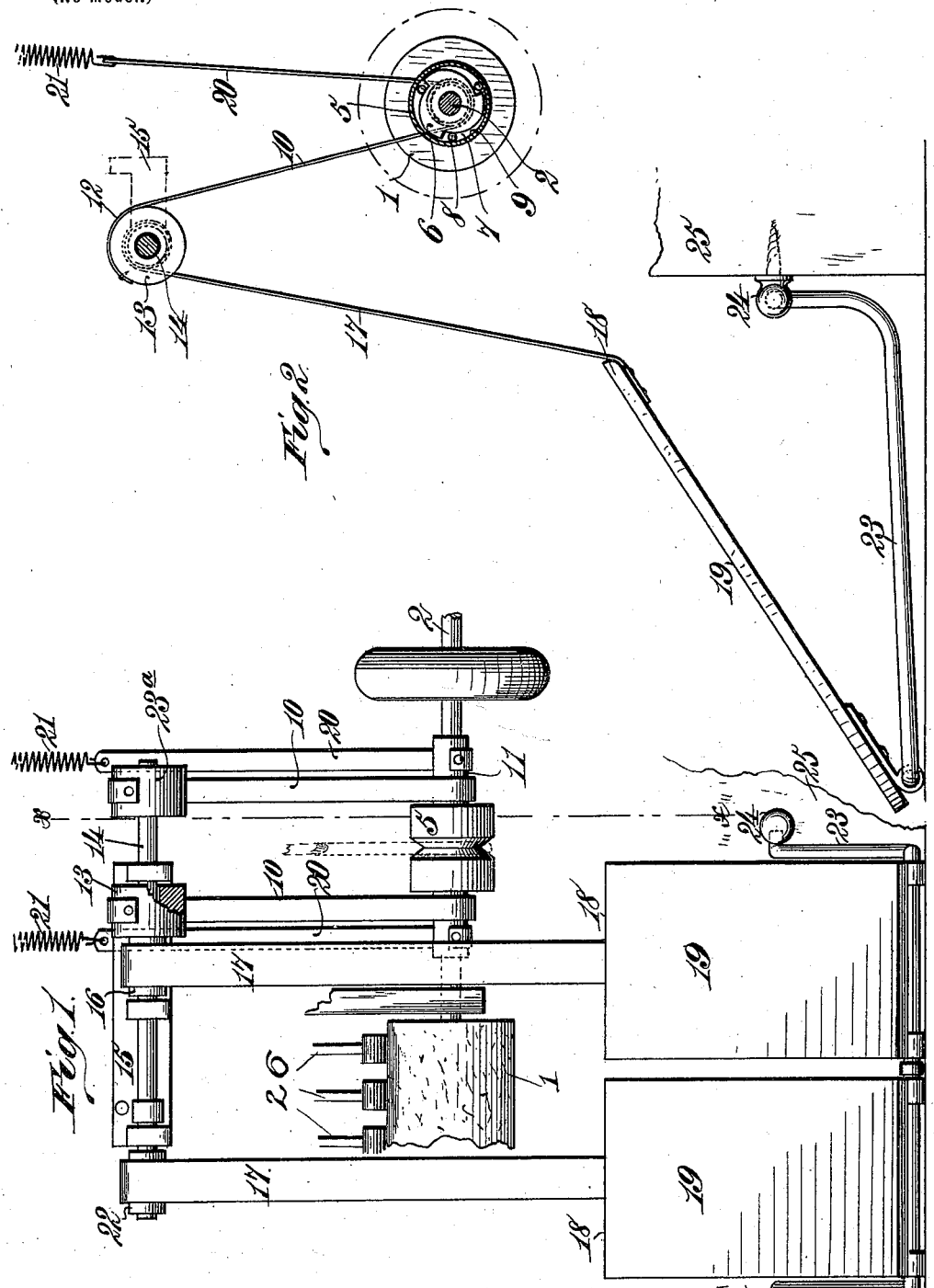
Witnesses.
Robert Curutt.
J. Granville Meyers.
Inventor.
George P. Clark.
By Davis & Co.
attys.

UNITED STATES PATENT OFFICE.

GEORGE P. CLARK, OF NEW YORK, N. Y., ASSIGNOR OF ONE-HALF TO G. HOWLETT DAVIS, OF NEW YORK, N. Y.

FOOT-PROPELLING DEVICE.

SPECIFICATION forming part of Letters Patent No. 692,626, dated February 4, 1902.

Application filed March 3, 1900. Serial No. 7,207. (No model.)

*To all whom it may concern:*

Be it known that I, GEORGE P. CLARK, a citizen of the United States of America, and a resident of the city, county, and State of New York, have invented certain new and useful Improvements in Foot-Propelling Devices for Self-Playing Musical Instruments, of which the following is a specification.

My present invention relates to improvements in foot-propelling devices for self-playing musical instruments, and has for its object to provide the combination and arrangement of parts illustrated in the accompanying drawings, in which—

Figure 1 is a front elevation showing the essential working elements of my mechanism. Fig. 2 is a transverse sectional view through line $x\ x$ of Fig. 1.

My invention is especially well adapted to that class of self-players styled "automatons," in which is employed an elongated revoluble friction-drum, against which one or more of a series of friction-levers are caused to impinge by the action of selector-levers entering into perforations in a note-sheet formed of comparatively thick paper. Such devices have heretofore been driven or propelled either by hand-crank or electric motors, the first method being objectionable because it was troublesome and crude and the second method proved unsatisfactory in nearly all cases where storage batteries were required, as the power demanded exhausted the batteries after a few hours' use.

Proceeding with a detailed description of my invention I would state that the friction-drum 1, having the elongated shaft 2, bearing in the support or frame 3, forms no part of my invention, being of a well-known form, having been in quite extensive public use for many years. Upon said shaft 2 I locate a double clutch-pulley 5, the loose sections 6 of which have each three raceways 7 therein, as shown in Fig. 2. The locking-balls 8 are of such a diameter as to fit loosely in the said raceways at their enlarged portions, but lock when forced midway thereof against the inner cylindrical surface 9 of the fixed sections 5, all in a manner well known to those acquainted with the action of clutch-pulleys.

The loose sections 6 of the clutch-pulleys are each revolved forward by a strap 10, which is secured to its reduced shoulder or neck 11, and after being wrapped about three turns around the neck the other end 12 of the strap is carried upward and secured to a two-shouldered pulley 13, loose upon a counter-shaft 14, bearing in the support 15. To the small shoulder 16 of said pulley 13 one end of a broad strap 17 is secured, and after several turns therearound it is carried downward and secured to the free or inward end 18 of the foot-pedal 19. Such foot-pedal 19 is kept raised and the several straps kept in their normal positions and wound around their respective pulleys, as shown in Fig. 2, by the action of the strap 20, secured at its lower end to the said reduced section 11 of the clutch-pulley and having a coiled tension-spring 21 at its upper end.

The above is descriptive more especially of the coacting mechanism of the right-hand foot-pedal, the action of which is as follows: Assuming the pedal to be raised, then a depression thereof will cause an unwinding of its strap 17 from the pulley 13 and a winding up thereof of the strap 10, which in turn causes an unwinding of its lower end from around the loose section 6, causing the latter to revolve forward, winding up thereon the spring-strap 20 and causing the balls 8 to lock and revolve forward the fixed section 5 of the clutch-pulley, carrying with it the friction-drum 1, also fixed to the shaft 2.

The action of the left-hand foot-pedal is identical with that just described, and the only peculiarity of its mechanism is that its counter-shaft pulleys 22 and 23ª are rigidly secured to the opposite ends of the counter-shaft 14, while the two-shouldered or double pulley 13 runs loose thereon.

The outer ends of each foot-pedal are hinged to a metallic rod-frame 23, the inner ends of which are sprung into two sockets 24, secured into the lower framing 25 of the piano.

In operation the rotary drum 1 is designed to actuate friction-shoes 26, that are arranged to be brought into frictional contact with the periphery of the drum by means of a perforated music-sheet, (not shown,) said shoes 26 each having a connection with one of the keys of the musical instrument, as is well known in the art of self-playing pianos.

Many minor changes may be made without avoiding the spirit of my invention. For instance, the straps 20 and their spiral springs might be dispensed with and a flat coil-spring affixed at one end to the loose section 6 of the clutch-pulley and the outer end affixed to the frame or other stationary part of the machine.

What I claim is—

1. In a mechanically-played musical instrument, the combination of an operating-pedal, means for transmitting reciprocating motion therefrom, friction-clutch mechanism converting the reciprocating motion into continuous rotary motion, the power-drum deriving continuous rotation from said clutch mechanism, and friction-shoes actuated by the drum, substantially as set forth.

2. A pedal-clutch mechanism for driving the motor-drum of a mechanically-operated musical instrument, comprising pedals 19, 19, pull-straps 17, 17, pulleys 13, 16, 22, 23$^a$, shaft 14, belts 10 and 20, clutch-sleeves 11, 11, eccentric clutches 6, and clutch-pulleys 5, on the shaft 2, of motor-drum 1, substantially as described.

3. A pedal-clutch mechanism for driving the motor-drum of a mechanically-operated musical instrument, comprising pedals 19, 19, pull-straps 17, 17, pulleys 13, 16, 22, 23$^a$, shaft 14, a shaft 2, clutch-sleeves 11, 11; eccentric clutches 6, mounted on shaft 2, clutch-pulleys 5, belts connecting said sleeves 11, 11, and pulleys 13, and 23$^a$, and a power-drum 1, on said shaft 2, substantially as described.

4. In a pedal-clutch mechanism for driving the power-drum of a mechanically-operated musical instrument, the combination with a shaft to be driven and the power-drum on said shaft, of a double clutch-pulley also on said shaft, a counter-shaft having pulleys thereon, straps connecting the loose pulley-sections on the driven shaft and the pulleys on the counter-shaft, a pair of foot-pedals, separate straps each attached at one end to one of the pedals and at the other end to the counter-shaft, and spring-controlled straps acting on the clutch-pulleys in opposition to the other straps acting on said pulleys, the parts operating substantially as described.

Signed by me at New York city this 28th day of February, 1900.

GEORGE P. CLARK.

Witnesses:
JULIUS GOLDWATER,
LOUIS GOEPPER.